United States Patent
Ito

(10) Patent No.: US 7,024,225 B2
(45) Date of Patent: Apr. 4, 2006

(54) RADIO COMMUNICATION APPARATUS

(75) Inventor: Takafumi Ito, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 801 days.

(21) Appl. No.: 09/984,165

(22) Filed: Oct. 29, 2001

(65) Prior Publication Data

US 2002/0065044 A1 May 30, 2002

(30) Foreign Application Priority Data

Nov. 30, 2000 (JP) ............................. 200-365260

(51) Int. Cl.
H04Q 7/20 (2006.01)

(52) U.S. Cl. .................... 455/558; 455/557; 370/463; 713/165

(58) Field of Classification Search ............ 455/414.1, 455/419, 420, 556.1, 557, 558, 100, 66.1, 455/158.2; 710/301, 36, 100, 52, 64, 58; 370/419, 535, 524, 463; 235/492, 487
See application file for complete search history.

(56) References Cited

U.S. PATENT DOCUMENTS

| 5,463,629 | A | * | 10/1995 | Ko | 370/463 |
|---|---|---|---|---|---|
| 5,753,902 | A | * | 5/1998 | Fujioka | 235/492 |
| 5,970,402 | A | * | 10/1999 | Vermeer | 455/347 |
| 5,987,534 | A | * | 11/1999 | Shibayama | 710/14 |
| 5,987,554 | A | | 11/1999 | Liu et al. | |
| 6,385,677 | B1 | * | 5/2002 | Yao | 711/115 |
| 6,665,741 | B1 | * | 12/2003 | Bronson | 710/8 |
| 6,824,063 | B1 | * | 11/2004 | Wallace et al. | 235/487 |

OTHER PUBLICATIONS

Takafumi Ito; "IC Card with Radio Interface Function, Antenna Module and Data Processing Apparatus Using the IC Card"; U.S. Appl. No. 09/748,857, filed Dec. 28, 2000.
"Introduction to Wireless LANs," The Wireless LAN Alliance, Georgia, Sep. 1999, XP-002295059.

* cited by examiner

Primary Examiner—Jean Gelin
(74) Attorney, Agent, or Firm—Finnegan, Henderson, Farabow, Garrett & Dunner, L.L.P.

(57) ABSTRACT

In an SD BT card, a UART is included in an SD IO controller to perform communication between this SD IO controller and a Bluetooth controller. A control register of the UART can be directly accessed from a host apparatus. This obviates the need to install in the SD IO controller an intelligent function of interpreting and executing commands from the host apparatus. This can simplify an interface unit and realize low cost.

23 Claims, 14 Drawing Sheets

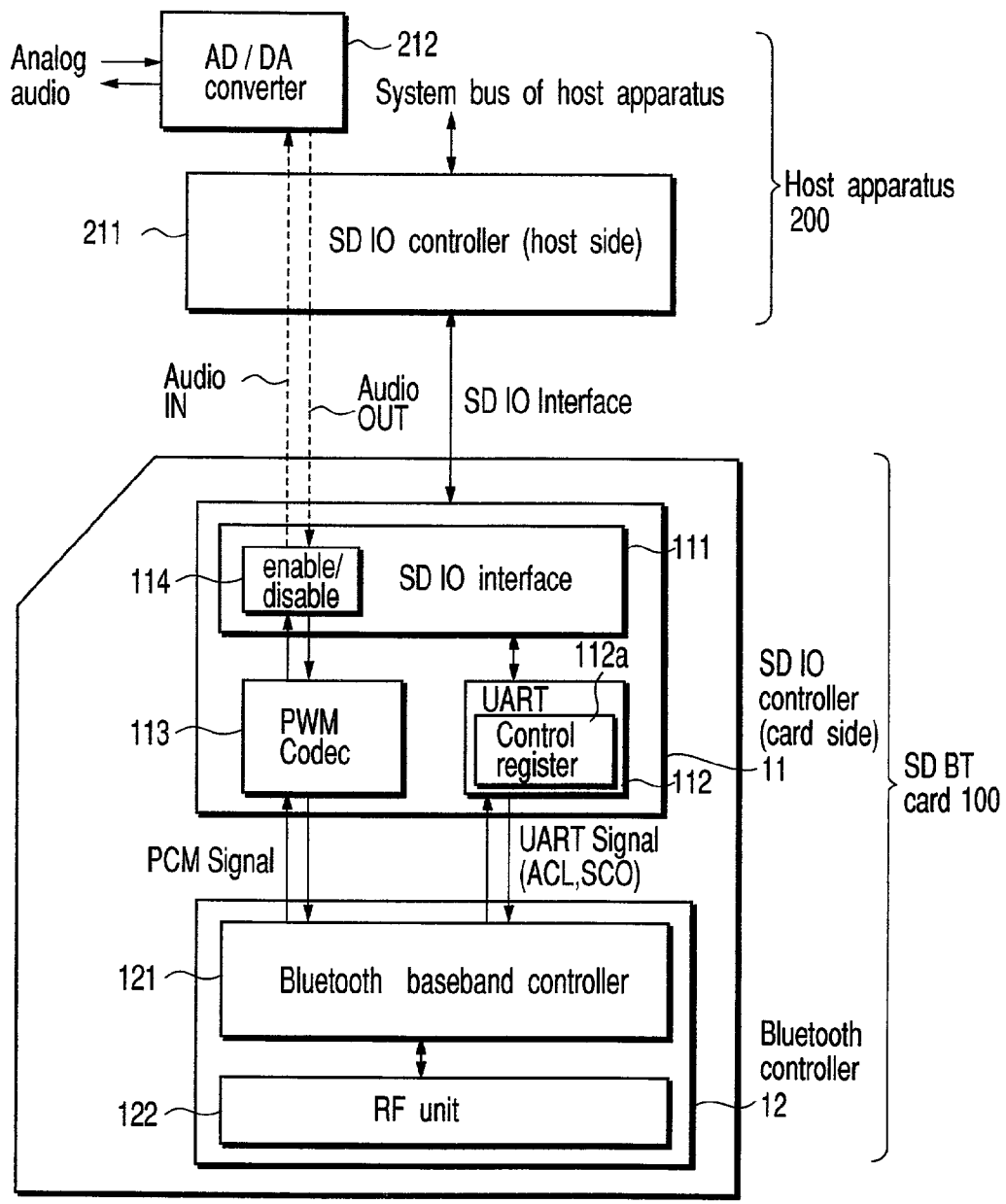
F I G. 1

IO register map

| SD-IO Func No. | IO Address | Group | Register(Read) | Register(Write) |
|---|---|---|---|---|
| 00h | | CIA | T.B.D | |
| 01h | 00h-1Fh | SDIO I/F | SDIO Bus Status Register (Detail is T.B.D) | SDIO Bus Control Register (Detail is T.B.D) |
| 01h | 80h | UART | RBR(Receiver Buffer Reg.) | THR (Transmitter Holding Reg.) |
| 01h | 81h | | IER (Interrupt Enable Reg.) | |
| 01h | 82h | | IIR (Interrupt Ident. Reg.) | FCR (FIFO Control Reg.) |
| 01h | 83h | | LCR(Line Control Reg.) | |
| 01h | 83h | | | MCR (Modem Control Reg.) |
| 01h | 85h | | LSR(Line Status Reg.) | ----- |
| 01h | 86h | | MSR(Modem Status Reg.) | ----- |
| 01h | 87h | | | ----- |
| 01h | 88h | | SPLCKCYCL(Sampling Clock Cycle Reg. Low) | |
| 01h | 89h | | SPLCKCYCH(Sampling Clock Cycle Reg. Hight) | |
| 01h | 8Ah | | NRZCYC(NRZ Cycle Reg.) | |
| 01h | 8Bh | | SPLCV(Sampling Counter Value Reg. ) | |
| 01h | 8Ch | | SIIR(Shadowed Int Ident. Reg. ) | ----- |
| 01h | 8Dh | | NVLDRF (Number of Valid Data in RCVR FIFO) | ----- |
| 01h | 8Eh | | NVLDXF (Number of Valid Data in XMIT FIFO) | ----- |
| 01h | C0h | Host Program ROM Access Register | Flash Memory Lower Address Register | |
| 01h | C1h | | Flash Memory Middle Address Register | |
| 01h | C2h | | Flash Memory Higher Address Register | |
| 01h | C3h | | ----- | |
| 01h | C4h | | Flash Memory Status Register | Flash Memory Control Register |
| 01h | C5h | | Flash Memory Data Read Register | Flash Memory Data Write Register |
| 01h | F0h | BT-Chip Status | Bluetooth Chip Status | ----- |
| 01h | F1h | BT-Chip Cont. | ----- | Bluetooth Chip Control |
| 01h | F8h | Special Register | Special Register | Special Register |

FIG. 2

|Pin| SD wide mode | | SD narrow mode | | SPI mode | |
|---|---|---|---|---|---|---|
| | 4bit mode | | 1bit mode | | | |
|1|CD/DAT[3]|Data line 3|N/C|Not Used|CS|Chip select|
|2|CMD|Command line|CMD|Command line|DI|Data inpit|
|3|VSS1|Ground|VSS1|Ground|VSS1|Ground|
|4|VDD|Supply voltage|VDD|Supply voltage|VDD|Supply voltage|
|5|CLK|Clock|CLK|Clock|SCLK|Clock|
|6|VSS2|Ground|VSS2|Ground|VSS2|Ground|
|7|DAT[0]|Data line 0|DATA|Data line|DO|Data output|
|8|DAT[1]|Data line 1|IRQ|Interrupt (OD)|IRQ|Interrupt (OD)|
|9|DAT[2]|Data line 2|N/C|Not Used|N/C|Not Used|

FIG. 6A

|Pin| SD wide mode | | SD narrow mode | | SPI mode | |
|---|---|---|---|---|---|---|
| | 4bit mode | | 1bit mode | | | |
|1|CD/DAT[3]|Data line 3|N/C|Audio OUT|CS|Chip select|
|2|CMD|Command line|CMD|Command line|DI|Data inpit|
|3|VSS1|Ground|VSS1|Ground|VSS1|Ground|
|4|VDD|Supply voltage|VDD|Supply voltage|VDD|Supply voltage|
|5|CLK|Clock|CLK|Clock|SCLK|Clock|
|6|VSS2|Ground|VSS2|Ground|VSS2|Ground|
|7|DAT[0]|Data line 0|DATA|Data line|DO|Data output|
|8|DAT[1]|Data line 1|IRQ|Interrupt (OD)|IRQ|Interrupt (OD)|
|9|DAT[2]|Data line 2|N/C|Audio IN|N/C|Not Used|

FIG. 6B

RADIO COMMUNICATION APPARATUS

CROSS-REFERENCE TO RELATED APPLICATIONS

This application is based upon and claims the benefit of priority from the prior Japanese Patent Application No. 2000-365260, filed Nov. 30, 2000, the entire contents of which are incorporated herein by reference.

BACKGROUND OF THE INVENTION

1. Field of the Invention

The present invention relates to a radio communication apparatus and, more particularly, to a small-sized radio communication card which can be detachably attached to various portable electronic apparatuses.

2. Description of the Related Art

Recently, memory cards smaller than PC cards have been developed for mobile apparatuses such as a PDA, camera, portable telephone, and audio player. An SD (Secure Digital) memory card of postage stamp size is known as a representative small-sized memory card.

Since the thickness of this SD memory card is only about 2 mm, no card edge type connector such as that of a PC card is used. Instead, electrodes functioning as signal pins are exposed from the surface of a card substrate and are used as a connector unit.

The number of signal pins of this connector unit is 9, four of which are used as data pins. That is, an SD memory card improves the data transfer rate by realizing 4-bit data transfer, compared to conventional small-sized memory cards which perform 1-bit data transfer.

In recent years, even such small-sized card media are beginning to be required to have functions as IO devices such as a modem card and network card. For example, by realizing an IO card (to be referred to as an SD IO card hereinafter) having the same shape as an SD memory card, it is possible to achieve effects such as: 1) an SD memory card and an SD IO card can be attached to the same card slot, and 2) the functions of even a small-sized electronic apparatus, on which a connector for connecting various I/O devices is difficult to mount, can be readily extended.

Lately, radio communication standards represented by Bluetooth for connecting diverse electronic apparatuses by radio have been layed down. If such radio communication functions are realized as an SD IO card, these radio communication functions can be easily installed in mobile apparatuses, such as a PDA, camera, portable telephone, and audio player, having an SD memory card slot.

As described above, however, an SD IO card is a thin, small-sized card of postage stamp size and is assumed to be used in a mobile apparatus. To install radio communication functions, therefore, it is important to simplify and downsize the internal arrangement of a card and to reduce the cost. Furthermore, since a mobile apparatus is a host, it is necessary to reduce the load on the host and well consider the mounting position of an antenna and the power-saving properties.

BRIEF SUMMARY OF THE INVENTION

The present invention has been made in consideration of the above situation, and has as its object to provide a radio communication apparatus which is simple and manufactured at low cost, and which can be suitably used in various portable electronic apparatuses.

To achieve the above object, the present invention is a radio communication apparatus detachably attached to a host apparatus, comprising a radio communication device; an interface interfacing with the host apparatus; and a communication controller having a control register which is directly accessed from the host apparatus via the interface, the communication controller performing communication between the interface and the radio communication device on the basis of contents of the control register set by the host apparatus.

This radio communication apparatus uses a serial communication controller such as a UART (Universal Asynchronous Receiver/Transmitter) to perform communication between the interface means and the radio communication device. Generally, a radio communication device such as Bluetooth often contains a serial communication function such as a UART. Therefore, by performing communication between the radio communication device and the interface means by such a serial communication interface, a serial communication function of the existing radio communication device can be effectively used. This can simplify the internal configuration of the card. Especially when a control register of the serial communication controller is so designed as to be directly accessed from the host apparatus, similar to a common I/O register in the card, the serial communication controller can be directly controlled from the host. This obviates the need to install an intelligent function, such as a processor, for interpreting and executing commands from the host. This can simplify the interface means and realize low cost.

Also, a nonvolatile memory storing a control program of the radio communication card, which is to be executed by the host apparatus, is arranged in the card. This allows the host apparatus to control the serial communication controller without preparing any software for serial communication control in the host apparatus. Accordingly, this card can be effectively used for any portable apparatus.

The present invention is a radio communication apparatus designed to be detachably attached to a host apparatus, characterized by comprising a radio communication device, interface means for interfacing with the host apparatus, the interface means having a first mode in which data is transferred to and from the host apparatus by using a plurality of data pins of the radio communication card and a second mode in which data is transferred to and from the host apparatus by using a specific data pin of the plurality of data pins, and communicating with the host apparatus by one of the first and second modes, and means for transmitting and receiving an audio signal between the host apparatus and the radio communication device by using the second mode, the means allocating an unused data pin in the second mode to transmission and reception of an audio signal between the host apparatus and the radio communication device, and transmitting and receiving an audio signal between the host apparatus and the radio communication device via the unused data pin.

In this radio communication apparatus, the first and second modes are prepared as modes for transferring data to and from the host. When the second mode is used, an unused data pin is present, so this unused pin is allocated to transmission and reception of an audio signal. In this case, an audio signal can be transmitted and received in parallel with transmission and reception of control data. Additionally, the definition of an unused pin is originally free. Therefore, an audio signal can be transmitted and received in a format different from that of common data transfer. This eliminates processing such as modulation and demodulation of audio data performed in real time by software processing by an MPU of the host apparatus, thereby reducing the load on the host apparatus. This effect is particularly notable when an audio signal codec for modulating and demodulating an audio signal is arranged in the card.

The present invention is a radio communication apparatus designed to be detachably attached to a host apparatus, characterized by comprising a radio communication device having a built-in processor, interface means for interfacing with the host apparatus, and a single nonvolatile memory shared by the radio communication device and the interface means, the nonvolatile memory storing firmware for controlling the operation of the built-in processor of the radio communication device, and card attribute information of the radio communication card, which is to be referred to by the host apparatus.

In this radio communication apparatus, a single nonvolatile memory stores the firmware for controlling the operation of the built-in processor of the radio communication device, and the card attribute information, and this nonvolatile memory is shared by the radio communication device and the interface means. This can reduce the number of components when compared to a configuration in which different nonvolatile memories are prepared to store the firmware and the card attribute information. Especially when the radio communication card includes means for loading the card attribute information from the nonvolatile memory into a memory of the interface means when the card is initialized so that the nonvolatile memory is exclusively possessed by the radio communication device after the card attribute information is loaded, this nonvolatile memory can be efficiently shared without causing any access contention.

The present invention is a radio communication apparatus designed to be detachably attached to a host apparatus, characterized by comprising a radio communication device, interface means for interfacing with the host apparatus, and a projecting portion formed on a card substrate of the radio communication card to accommodate an antenna to be electrically connected to the radio communication device, wherein the projecting portion accommodates at least an RF controller of the radio communication device together with the antenna.

When at least the RF controller of the radio communication device is mounted together with the antenna in the projecting portion, an optimum parts arrangement which effectively uses the entire mounting space of the card is realized. Also, since the projecting portion projects to the outside of the card slot of the host apparatus, the influence the radiation noise from the RF controller has on the host apparatus can be reduced. Furthermore, unlike a card substrate portion, this projecting portion can be designed to have a sufficient thickness regardless of the height of the card slot of the host apparatus. Therefore, the RF controller can be covered with a shielding member such as a shield cover. This can eliminate electromagnetic interference to other circuit components in the card or to the host apparatus.

The present invention is a radio communication apparatus designed to be detachably attached to a host apparatus, characterized by comprising a radio communication device, a connector unit including a plurality of electrodes formed on the surface of a substrate of the radio communication card, an interface device for interfacing with the host apparatus via the connector unit, and a printed wiring board for mounting the radio communication device and the interface device, wherein mounting regions for mounting an antenna to be electrically connected to the radio communication device are formed on both front and rear surfaces of the printed wiring board.

By the use of this board structure, the antenna mounting positions can be switched by using one board. That is, a card is inserted with its upper surface facing up or down in accordance with the type of host apparatus (e.g., PDA). When the host apparatus is placed on a metal table or the like, the radio communication performance deteriorates if the table and the internal antenna of the card are close to each other. To avoid this, the antenna is desirably positioned as high as possible from the installation surface. To this end, it is favorable to prepare a type in which the antenna is on the card upper surface and a type in which the antenna is on the card lower surface, in accordance with the form of a host apparatus to be used. However, by the use of the above board structure, these two types can be manufactured with a single board (PWB).

The present invention is a radio communication apparatus designed to be detachably attached to a host apparatus, characterized by comprising a radio communication device, interface means for interfacing with the host apparatus, a status indicator to be turned on and off in synchronism with transmission of a radio signal by the radio communication device, and control means for controlling permission or inhibition of lighting of the status indicator, in accordance with an instruction input from the host apparatus via the interface means.

With this arrangement, lighting of the status indicator can be permitted or inhibited in accordance with an instruction from the host apparatus. Therefore, the power consumption can be reduced by inhibiting lighting of the status indicator where necessary.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention and, together with the generation description given above and the detailed description of the embodiments given below, serve to explain the principles of the invention.

FIG. 1 is a block diagram showing the arrangement of a radio communication card according to an embodiment of the present invention;

FIG. 2 is a view for explaining I/O registers in the radio communication card of the embodiment;

FIGS. 6A and 6B are views showing the allocation of signal pins to a plurality of modes prepared for the radio communication card of the embodiment;

DETAILED DESCRIPTION OF THE INVENTION

Figure 3:
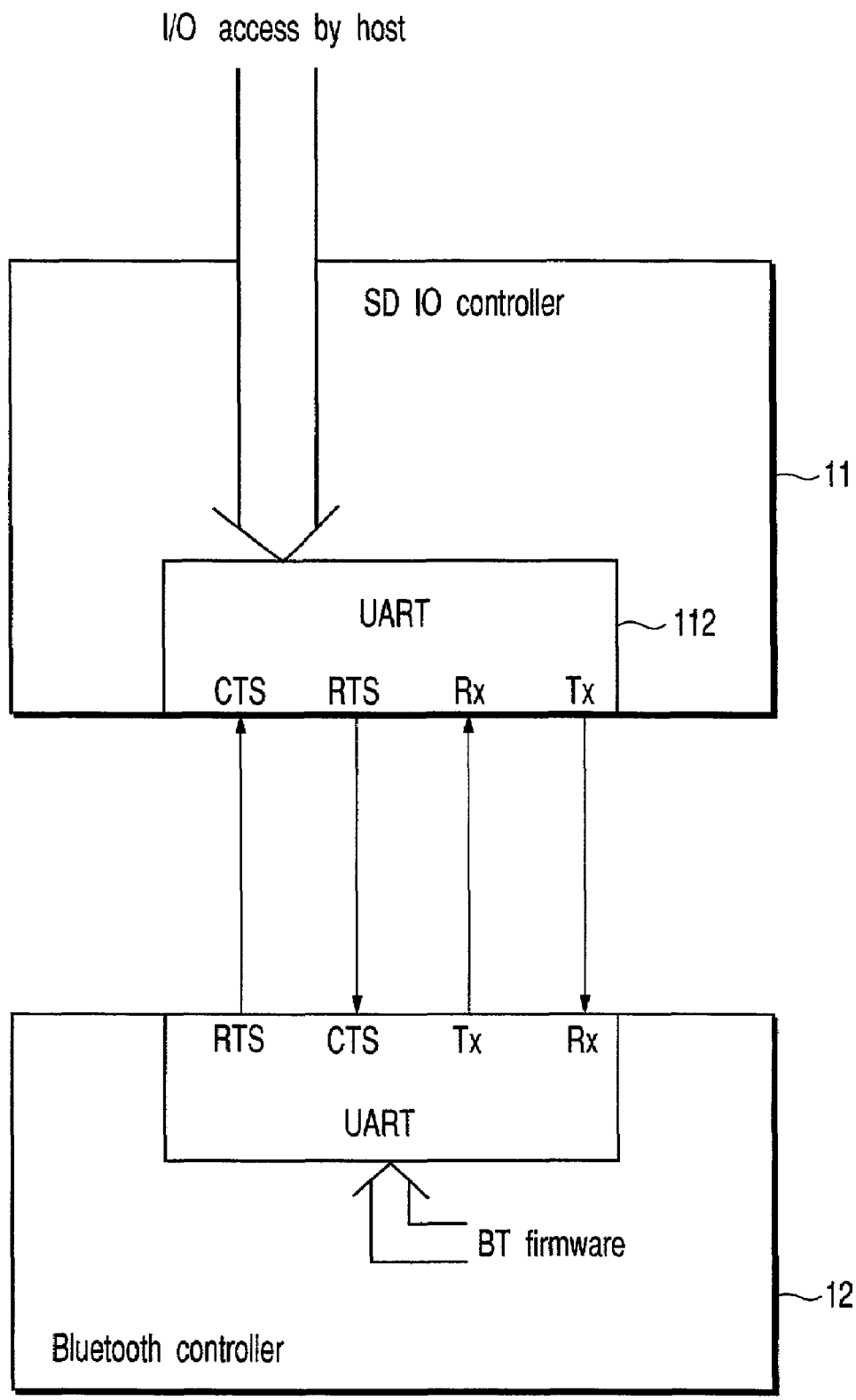
FIG. 3 is a view for explaining control of UARTs in the radio communication card of the embodiment.

An embodiment of the present invention will be described below with reference to the accompanying drawings.

FIG. 1 shows the relationship between a radio communication card according to the embodiment of the present invention and a host apparatus which can be used by attaching the radio communication card.

This radio communication card is an SD IO card (to be referred to as an SD BT card hereinafter) having a radio communication function of BT (Bluetooth) standard. This SD BT card 100 can be detachably attached to a card slot of a host apparatus 200. As described previously, the SD BT card 100 is a small-sized IC card of postage stamp size to be used for a mobile apparatus. As shown in FIG. 1, this card incorporates an SD IO controller 11 and a Bluetooth controller 12. The SD IO controller 11 is a card interface for interfacing with the host apparatus 200 and is implemented by a one-chip LSI. The host apparatus 200 and the Bluetooth controller 12 communicate via the SD IO controller 11. As shown in FIG. 1, this SD IO controller 11 includes an SD IO interface unit 111, a UART (Universal Asynchronous Receiver/Transmitter) 112, and a PWM codec 113.

The SD IO interface unit 111 is an interface circuit for communicating with the host apparatus 200 via nine signal pins formed on the substrate surface of this SD BT card 100. This SD IO interface unit 111 has a function of receiving from the host apparatus 200 data to be transmitted to another radio apparatus by radio, and a function of transmitting to the host apparatus 200 data received by communication with another radio apparatus.

The UART 112 is a controller for exchanging data between the SD IO controller 11 and the Bluetooth controller 12 by serial communication. As shown in FIG. 1, this UART 112 is placed between the SD IO interface unit 111 and the Bluetooth controller 12. The UART is a serial communication interface controller represented by RS232C, and the SD IO controller 11 and the Bluetooth controller 12 are connected via well-known UART signals (Tx, Rx, RTS, and CTS). By a serial interface using this UART signal line, packets (an ACL packet and SCO packet) used in radio communication of Bluetooth standard are exchanged between the SD IO controller 11 and the Bluetooth controller 12.

The UART 112 has a control register 112a for controlling its operation. This control register 112a can be directly seen from the host apparatus 200, similar to other I/O registers in the SD IO interface unit 111. So, the host apparatus 200 can directly access the control register 112a via the SD IO interface unit 111. Serial communication by the UART 112 is done on the basis of the set contents of this control register 112a. That is, the host apparatus 200 can directly control data transmission and reception with respect to the Bluetooth controller 12 by accessing the control register 112a.

The PWM codec 113 modulates and demodulates an audio signal exchanged between the host apparatus 200 and the Bluetooth controller 12. This PWM codec 113 is used for a direct audio function of this card 100. Details of this direct audio function will be explained later with reference to figures from FIGS. 6A and 6B and subsequent drawings. Basically, this direct audio function is a function of directly transmitting and receiving audio signals to and from the host apparatus 200 by using unused data pins in a data transfer mode (1-bit mode) in which only one of four data pins is used. The direct audio function is an option function usable only by a host apparatus corresponding to the function. For this purpose, the SD IO interface unit 111 has an enable/disable circuit 114 for permitting or inhibiting execution of the direct audio function. The direct audio function is made effective only when the use of the function is requested by the host apparatus 200.

The Bluetooth controller 12 is a radio communication module capable of radio data communication with one or more radio communication apparatuses by using a radio wave of an industrial band of 2.4 GHz called an ISM band (Industrial, Scientific and Medical Band). This Bluetooth controller 12 executes short-range radio data communication by spread spectrum modulation (CDMA) using frequency hopping (FH). Bluetooth radio communication forms are a synchronous connection form called SCO (synchronous audio channel) and an asynchronous connection form called ACL (asynchronous data channel). Packets used in SCO are SCO packets, and those used in ACL are ACL packets. SCO packets are used to perform telephone-quality voice communication in real time.

The Bluetooth controller 12 is implemented by a one-chip LSI which includes a baseband controller 121 and an RF (Radio Frequency) control unit 122 (to be referred to an RF unit hereinafter). The baseband controller 121 is a functional module for performing baseband processing such as link control and hopping pattern control. The RF unit 122 includes an RF transceiver circuit and RF amplifier for transmitting and receiving RF signals, and controls these components. The baseband controller 121 contains a UART as a host interface function and also contains an I/O interface for PCM voice communication.

The host apparatus 200 is a portable apparatus such as a PDA, camera, portable telephone, or audio player, and has an SD IO controller 211 for interfacing with the SD BT card 100. This SD IO controller 211 corresponding to a direct audio function can directly receive and output audio signals from and to the PWM codec 113 by using unused data pins in 1-bit mode. An audio signal (Audio IN) received by the SD IO controller 211 from the SD BT card 100 is directly transmitted to an AD/DA converter 212 where the signal is converted into an analog signal, and this analog signal is reproduced from a loudspeaker or the like. Also, an analog audio signal input from a microphone or the like is converted into a digital signal such as PWM by the AD/DA converter 212, and this digital signal is transmitted to the SD BT card 100 via the SD IO controller 211 (Audio OUT).

IO registers of the SD BT card 100 will be described below with reference to FIG. 2.

IO registers are obtained by adding several registers to the UART control register 112a described above.

(1) A register having function No. 0 is used as a CIA (Common IO Area). This register includes a register for accessing a control program of the SD BT card 100. This control program is required for the host apparatus 200 to use the SD BT card 100. When the SD BT card 100 is initialized, i.e., when the host apparatus 200 detects the SD BT card 100, the control program is uploaded from the SD BT card 100 to the host apparatus 200. The host apparatus 200 directly accesses the Bluetooth controller 12 via the UART control register. The procedure of this access process is controlled by the control program loaded from the SD BT card 100.

(2) Addresses 80h to 87h having function No. 1 are UART compatible registers called 16550.

An RBR (Receiver Buffer Register) is a register for accessing a receiving FIFO buffer of the UART 112. When this register is read, data at the top of the receiving FIFO buffer is read out.

A THR (Transmitter Holding Register) is a register for writing transmission data in a transmitting FIFO buffer of the UART 112.

An IER (Interrupt Enable Register) controls enable/disable of UART interrupt. When a corresponding bit is set to 1, an interrupt corresponding to this bit is enabled; when the bit is set to 0, the interrupt is disabled.

An IIR (Interrupt Ident. Register) is a register for indicating the state of an interrupt that has occurred. This IIR is primarily used to control the interrupt priority order.

An FCR (FIFO Control Register) is a register to be used to control the transmitting FIFO buffer and the receiving FIFO buffer.

An LCR (Line Control Register) is a register for setting the character format of start-stop synchronization communication and controlling the output of a frequency dividing clock.

An MCR (Modem Control Register) is a register for controlling a modem signal RTS (Request to Send). The RTS is a signal indicating "transmission request". When a predetermined bit of the MCR is set to 1, the RTS is forcedly activated; when the bit is set to 0, the RTS is forcedly inactivated.

An LSR (Line Status Register) is a register which provides information concerning data transfer to the host.

An MSR (Modem Status Register) is a register for holding the status of a modem signal CTS (Clear to Send). The CTS is a signal indicating "transmission is possible".

Addresses 88h to 8Eh are UART extended registers.

(3) Addresses C0h to C5h are address registers and data registers for accessing the CSA described above. Addresses F0h and F1h are control registers of the Bluetooth controller 12. These registers include Bluetooth Chip Status which is a register for reading the status of the controller 12, and Bluetooth Chip Control which is a register for controlling, e.g., reset of the controller 12.

FIG. 3 shows the principle of communications between the SD IO controller 11 and the Bluetooth controller 12 performed by using the UART interface. As shown in FIG. 3, both SD IO controller 11 and the Bluetooth controller 12 have a UART. The UART 112 of the SD IO controller 11 is controlled by the host apparatus 200 which accesses the control register 112a described above. The UART of the Bluetooth controller 12 is controlled by firmware executed by a built-in processor of the Bluetooth controller 12.

That is, in this embodiment, the Bluetooth controller 12 has a processor, but the SD IO controller 11 has no such intelligent function as a processor. Therefore, the host apparatus 200 controls the whole operation of the Bluetooth controller 12, including data transmission/reception with respect to the Bluetooth controller 12. This can simplify the arrangement of the SD IO controller 11.

Figures 4A, 4B:
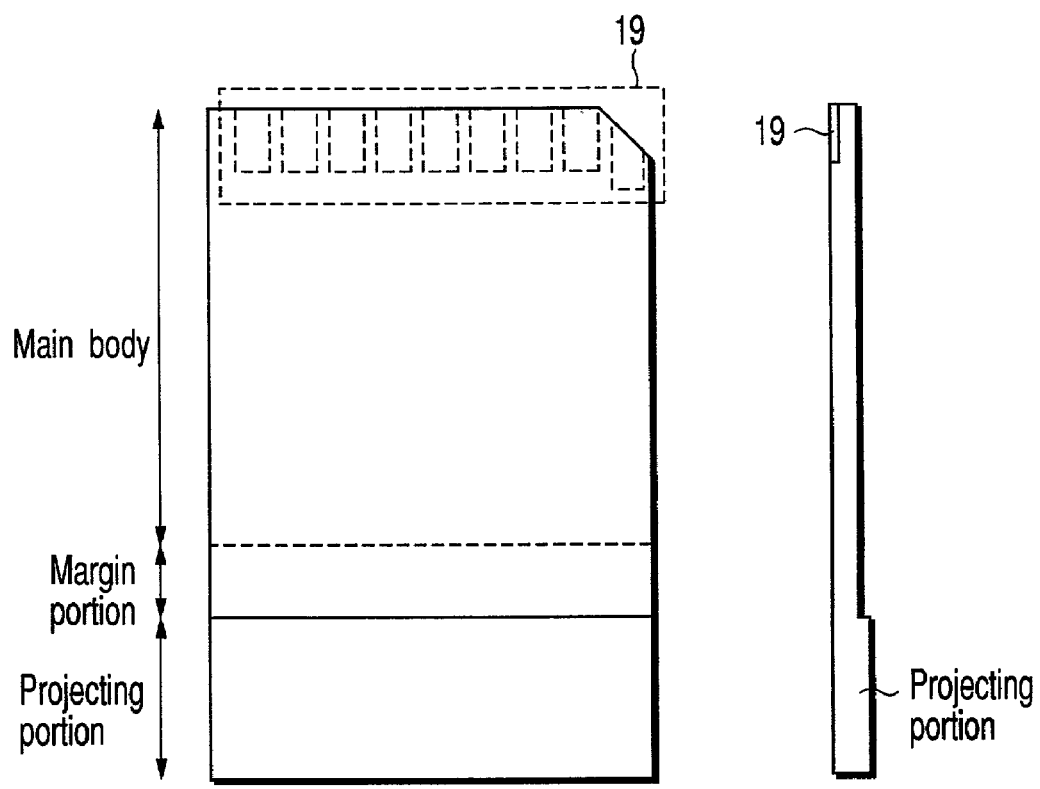
FIGS. 4A and 4B are views showing the outer shape of the radio communication card of the embodiment.

The outer shape of the SD BT card 100 will be described below with reference to FIGS. 4A and 4B. FIG. 4A is a plan view showing the SD BT card 100 from the front. FIG. 4B is a side view of the card 100.

To maintain mechanical compatibility with an SD memory card as described above, a main body of the card substrate of the SD BT card 100, which is to be inserted into the card slot of the host apparatus 200, has exactly the same shape as an SD memory card. In one end portion of this main body, a connector unit 19 having nine electrodes is formed on the back side of this card substrate. Each electrode is exposed to the outside from the back side of the substrate.

In the other end portion of the main body, a margin portion and a projecting portion extend from the main body. The projecting portion projects to the outside of the card slot when the SD BT card 100 is attached. This projecting portion is slightly thicker than the main body and the margin portion. The Bluetooth controller 12 and an antenna electrically connected to it are formed in the projecting portion. The margin portion is formed to extend the projecting portion to the outside of the card slot of the host apparatus 200. The longitudinal dimension of this SD BT card 100 is longer by the margin portion and the projecting portion than an SD memory card.

Signal pins of the connector unit 19 are defined as follows in the same manner as in an SD memory card.

That is, a card detection signal (CD) and data DAT[3] are allocated to signal pin [1]. The card detection signal (CD) informs the host apparatus 200 of attachment of the card. When the SD BT card 100 is attached, this card detection signal (CD) changes to L level. A command signal (CMD) used for command/status transfer is allocated to signal pin [2]. A ground power supply (Vss1) and a positive power supply (Vdd) are allocated to signal pin [3] and signal pin [4], respectively. A synchronizing clock signal (CLK) for command/status transfer is allocated to signal pin [5], and a ground power supply (Vss2) is allocated to signal pin [6]. Also, data DAT[0], DAT[1], and DAT[2] are allocated to signal pins [7], [8], and [9], respectively.

Figure 5:
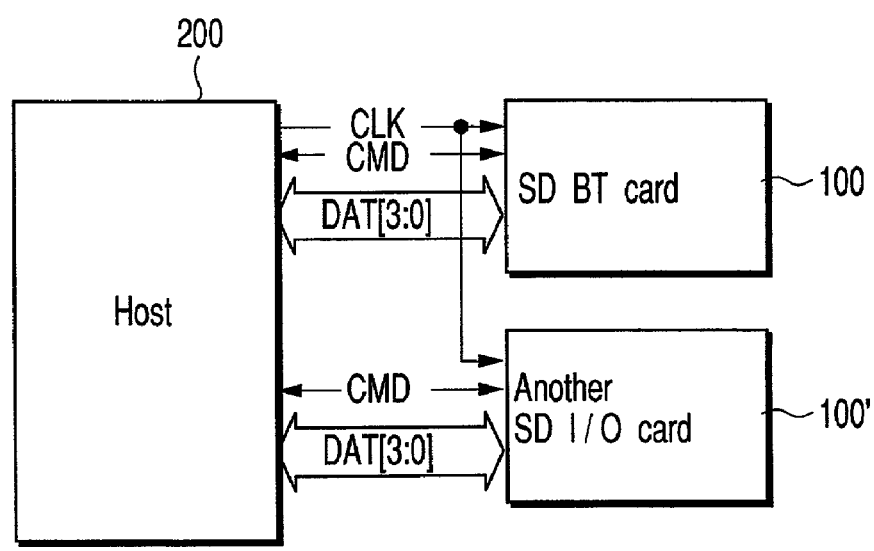
FIG. 5 is view for explaining an interface between the radio communication card of the embodiment and a host.

As shown in FIG. 5, communication between the host apparatus 200 and the SD BT card 100 is done by using the clock CLK, the command CMD, and data DAT[3:0].

As shown in FIGS. 6A and 6B, communication between the host apparatus 200 and the SD BT card 100 has a 4-bit mode (SD wide mode), a 1-bit mode (SD narrow mode), and a special mode called SPI (Special Peripheral Interface).

In 4-bit mode, data is transferred using four data pins (DAT[3:0]). In 1-bit mode, data is transferred using only DAT[0] of the four data pins (data DAT[3:0]). Which of the 4-bit mode and the 1-bit mode is to be used is determined in accordance with the performance of the host apparatus 200. The SPI mode is an access mode dedicated to a flash card.

As shown in FIG. 6A, DAT[3:1] is not used in 1-bit mode. In the above-mentioned direct audio function, as shown in FIG. 6B, audio signals are transmitted and received by using DAT[3] and DAT[2] of DAT[3:1], which are not used in 1-bit mode. DAT[3] is used as Audio OUT, and DAT[2] is used as Audio IN. As an audio signal transmitted and received by using the direct audio function, a PWM (Pulse Width Modulation) signal, for example, is used as described previously. By the use of this direct audio function, telephone voices can be communicated without any software processing in the host apparatus 200.

The modulation/demodulation function of the PWM codec 113 will be described below with reference to FIGS. 7 to 9.

Figure 7:
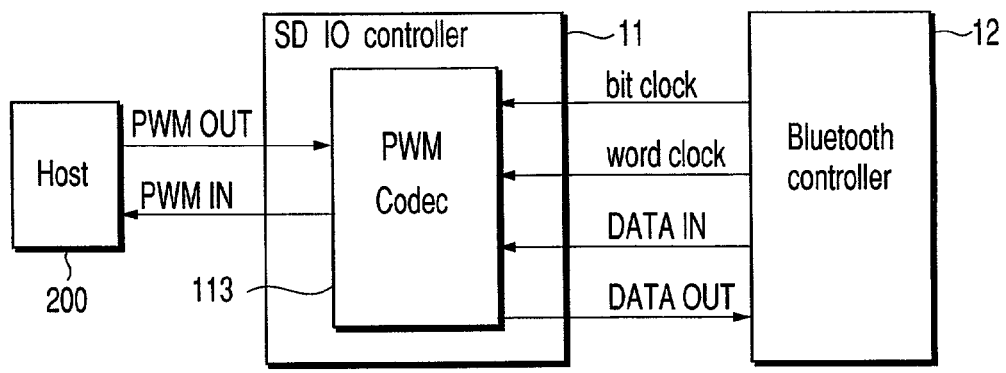
FIG. 7 is a view for explaining the function of an audio codec of the radio communication card of the embodiment.

As shown in FIG. 7, this PWM codec 113 exchanges PCM digital audio signals with the Bluetooth controller 12, and exchanges PWM digital audio signals with the host apparatus 200. As in FIG. 7, the I/O interface of PCM digital audio signals requires four signal lines (bit clock, word clock, DATA IN, and DATA OUT), whereas the I/O interface of PWM digital audio signals requires only two signal lines Audio IN and Audio OUT.

Figure 8:
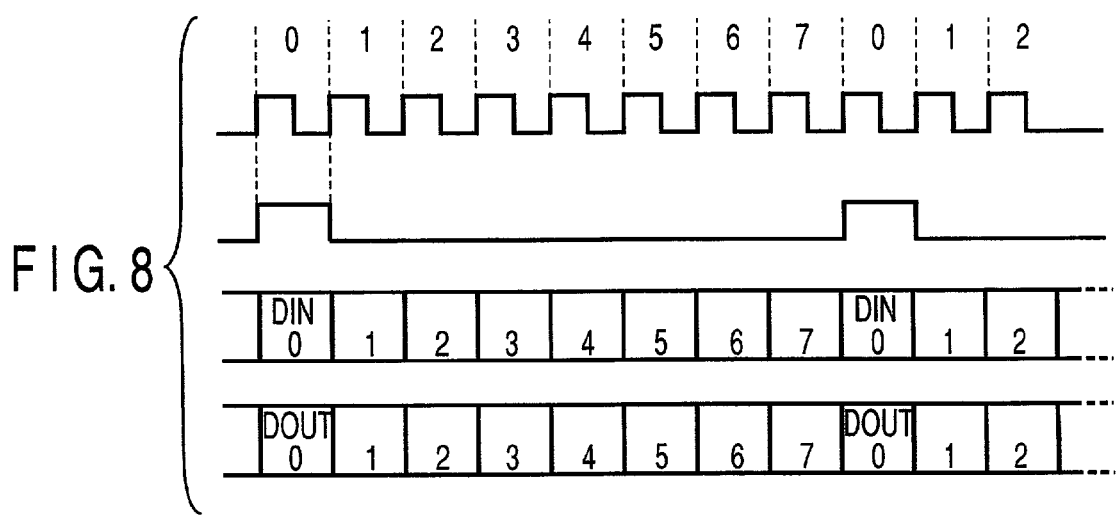
FIG. 8 is a timing chart for explaining a PCM audio signal transfer operation performed by the radio communication card of the embodiment.
Figure 9:
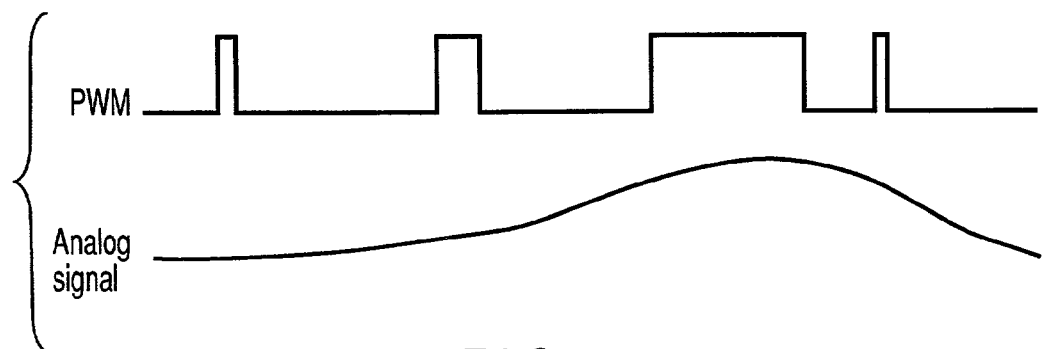
FIG. 9 is a view for explaining a PCM audio signal in the radio communication card of the embodiment.

That is, when the sound volume level of a PCM digital audio signal is represented by, e.g., 8-bit word data, as shown in FIG. 8, 8-bit data is serially transferred to DATA IN and DATA OUT in synchronism with bit clock. Also, the timing of the header of each word is given by word clock.

Although this PCM audio signal can also be exchanged with the host apparatus 200, four signal lines are necessary in this case. To transfer an audio signal from the Bluetooth controller 12 to the host apparatus 200, therefore, this audio signal is converted into a PWM signal format by the PWM codec 113 and then transmitted to the host apparatus 200. More specifically, PWM is performed for a PCM digital audio signal. Since PWM is a signal close to a raw analog audio signal as shown in FIG. 9, this is equivalent to transmitting a signal obtained by demodulating a PCM digital audio signal to the host apparatus 200. It is of course also possible to transmit to the host apparatus 200 an analog audio signal instead of a PWM digital audio signal.

Processing which is the reverse of the above processing is performed when an audio signal is transferred from the host apparatus 200 to the Bluetooth controller 12.

As described above, by the use of the modes of the direct audio function, audio signals can be exchanged in parallel with exchange of control data. In addition, the definition of an unused pin is originally free. Accordingly, audio signals can be directly exchanged with the host apparatus 200 by a signal format or protocol different from that used in common data transfer. This obviates processing such as modulation/demodulation of audio data performed in real time by software processing by an MPU of the host apparatus 200. This is particularly suitable for a mobile apparatus in which the performance of an MPU is limited.

Hardware components necessary to implement the SD BT card 100 will be described in detail below.

This SD BT card 100 requires a flash EEPROM (to be referred to as a flash ROM hereinafter) which is an electrically rewritable nonvolatile memory. The internal flash ROM of the card 100 must store firmware for the Bluetooth controller 12, card attribute information (CIS: Card Information Structure) as an SD IO card, and a card control program (CSA: Code Storage Area) to be uploaded to the host apparatus 200.

As this flash ROM chip, it is simplest in control to use two ROMs, i.e., a ROM for storing the firmware of the Bluetooth controller 12 and a ROM for storing the CSA and the card attribute information. To reduce the number of components to realize low cost, however, it is more favorable to store the firmware, CSA, and card information in a single flash ROM and share this flash ROM by the Bluetooth controller 12 and the SD IO controller 11.

Figure 10:
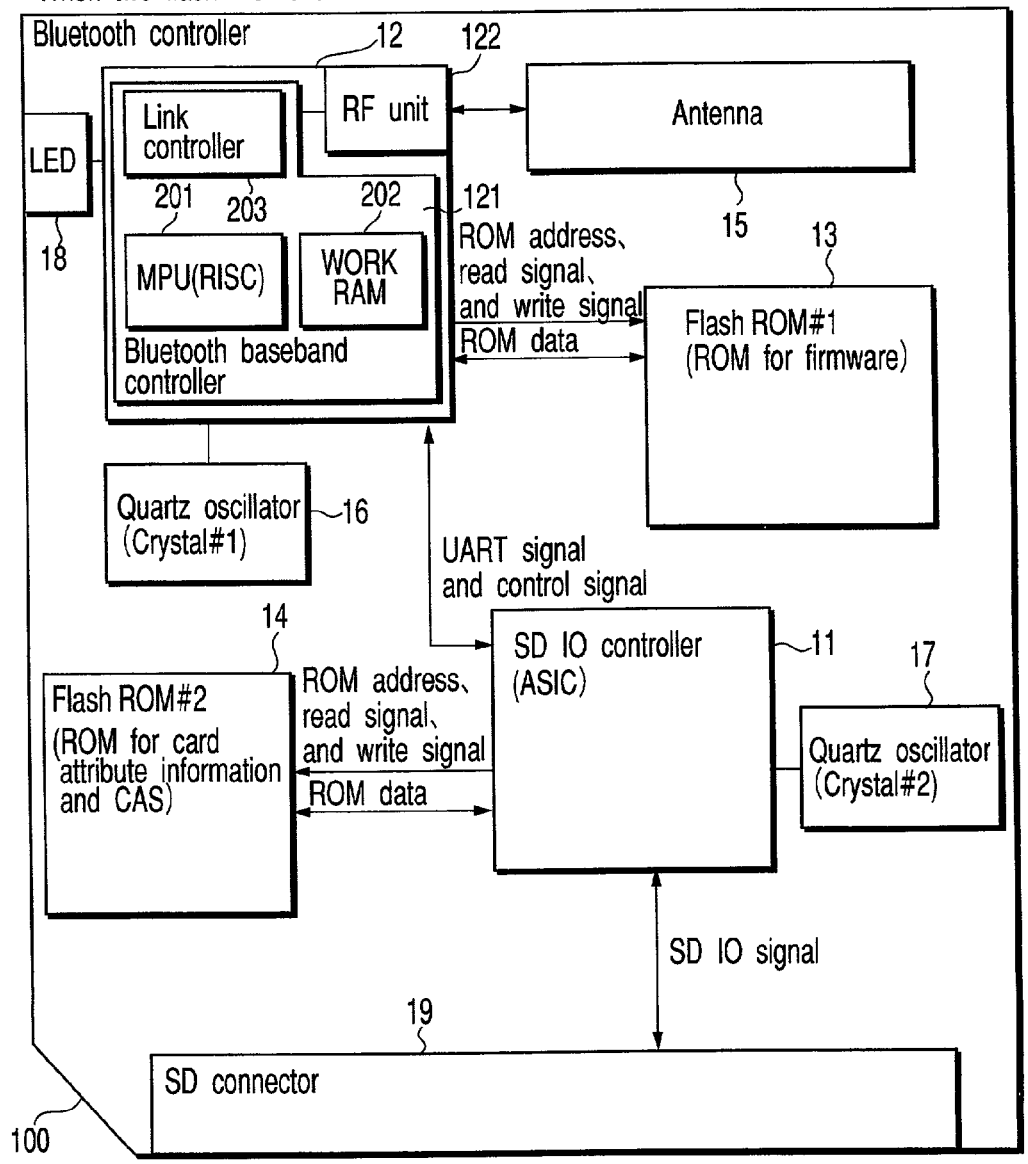
FIG. 10 is a view showing an example of a practical configuration of the radio communication card of the embodiment.

FIG. 10 shows the arrangement of the SD BT card 100 when two flash ROMs are used.

As shown in FIG. 10, the SD BT card 100 includes a first flash ROM 13, a second flash ROM 14, an antenna 15, a first quartz oscillator 16, a second quartz oscillator 17, an LED 18, and the connector unit 19, in addition to the SD IO controller 11 and the Bluetooth controller 12 described above.

The first flash ROM 13 stores the firmware for the Bluetooth controller 12. The Bluetooth controller 12 has a memory control interface for accessing this first flash ROM 13, loads the firmware from the first flash ROM 13, and executes the loaded firmware. As shown in FIG. 10, the baseband controller 121 of the Bluetooth controller 12 comprises an MPU 201 for executing baseband processing in accordance with the firmware, a working memory (WORK RAM) 202, and a link controller 203 for performing control for radio link establishment.

The second flash ROM 14 stores the card attribute information, and the CSA including programs (an HCI driver and protocol stack) to be loaded into the host apparatus 200 and executed. The SD IO controller 11 has a memory control interface for accessing the second flash ROM 14, and can load the card attribute information and the CSA from the second flash ROM 14.

The antenna 15 is used to radiate and guide a radio signal of a 2.4-GHz band, and is electrically connected to the RF unit 122 of the Bluetooth controller 12. As this antenna 15, a so-called chip antenna is used.

The first and second quartz oscillators 16 and 17 are clock generators for generating operating clocks for the Bluetooth controller 12 and the SD IO controller 11. The LED 18 is a status indicator which is turned on in synchronism with the transmission of a radio signal by a radio communication apparatus.

Figure 11:
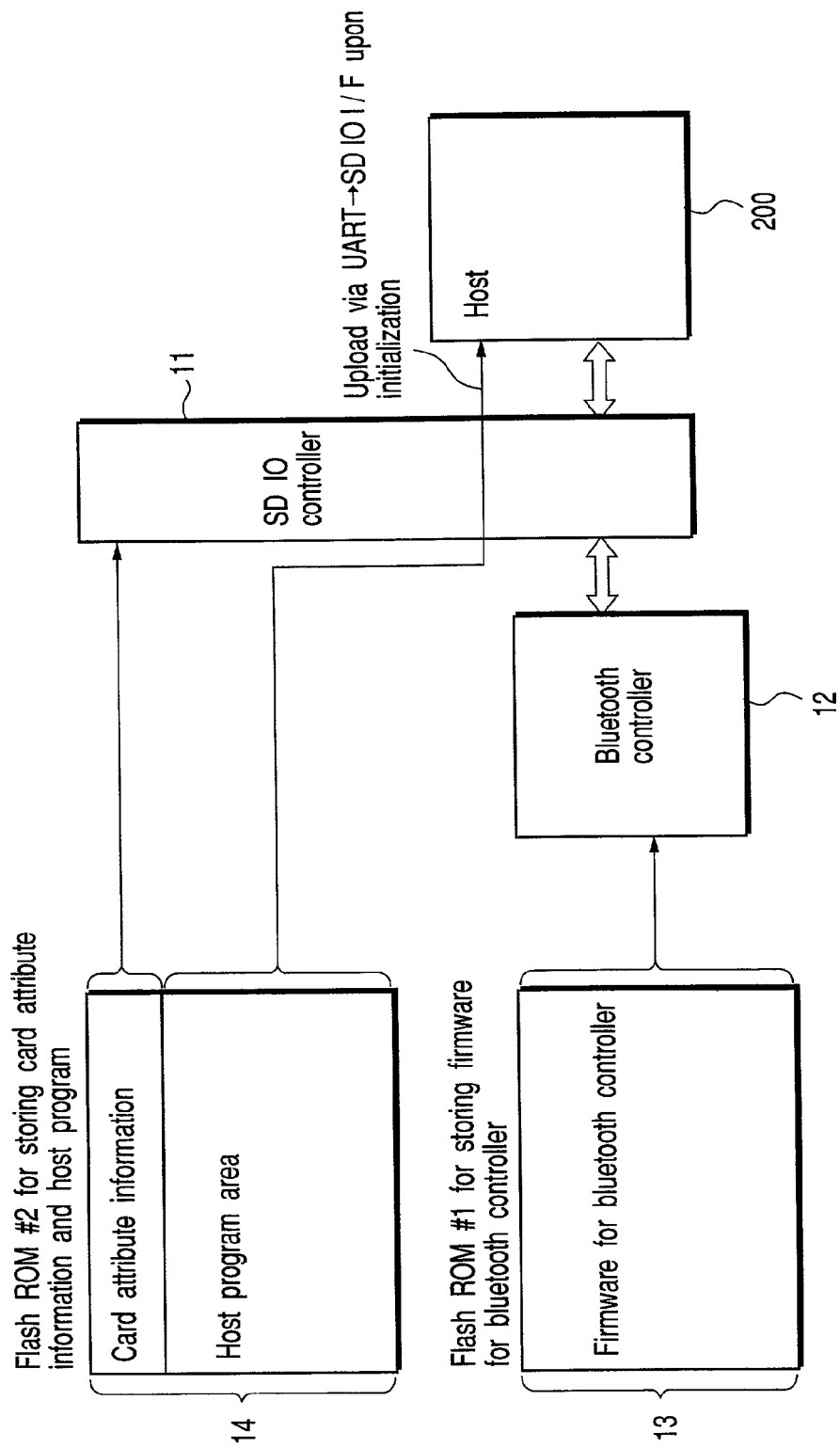
FIG. 11 is a view for explaining the state of use of flash ROMs in the radio communication card in FIG. 10.

FIG. 11 shows the form of use of the first and second flash ROMs 13 and 14.

After the SD BT card 100 is reset and initialized, the card attribute information is loaded from the flash ROM 14 into the RAM of the SD IO controller 11, and then read out from the host apparatus 200. Also, when the SD BT card 100 is initialized, the host apparatus 200 uploads to its own RAM the CSA (program for the host) of the flash ROM 14 and uses this CSA as a program for controlling the card 100. This function is especially effective for a host apparatus, such as a PDA or a digital camera, in which it is not easy to prestore a device driver for the SD BT card 100. Note that the CSA is an IO-mapped memory area.

The firmware of the flash ROM 13 is loaded by the Bluetooth controller 12 and executed by the MPU 201.

Figure 12:
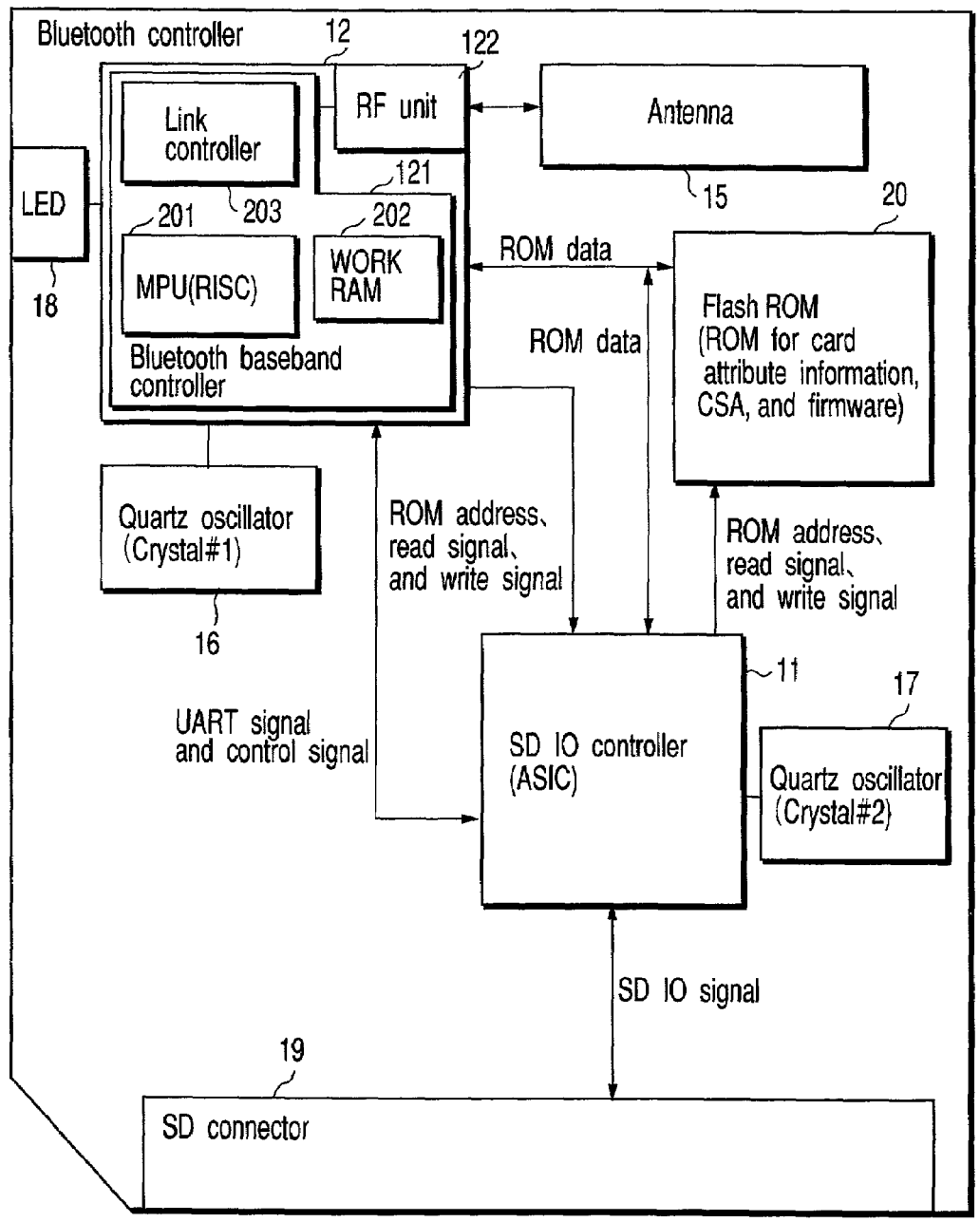
FIG. 12 is a view showing another example of a practical configuration of the radio communication card of the embodiment.

FIG. 12 shows the arrangement of the SD BT card 100 when one flash ROM is used.

That is, in FIG. 12, one flash ROM 20 is used instead of the two flash ROMs 13 and 14 shown in FIG. 10. This flash memory 20 is shared by the Bluetooth controller 12 and the SD IO controller 11, and stores the firmware for the Bluetooth controller 12, the card attribute information, and the CSA including programs (an HCI driver and protocol stack) to be loaded into the host apparatus 200 and executed.

As shown in FIG. 12, data input/output lines of this flash memory 20 are directly connected to the Bluetooth controller 12 and the SD IO controller 11. To prevent access contention, an access control signal line (address, read signal, and write signal) of the flash ROM 20 is connected only to the SD IO controller 11. Therefore, memory access from the Bluetooth controller 12 is done via the SD IO controller 11.

Figure 13:
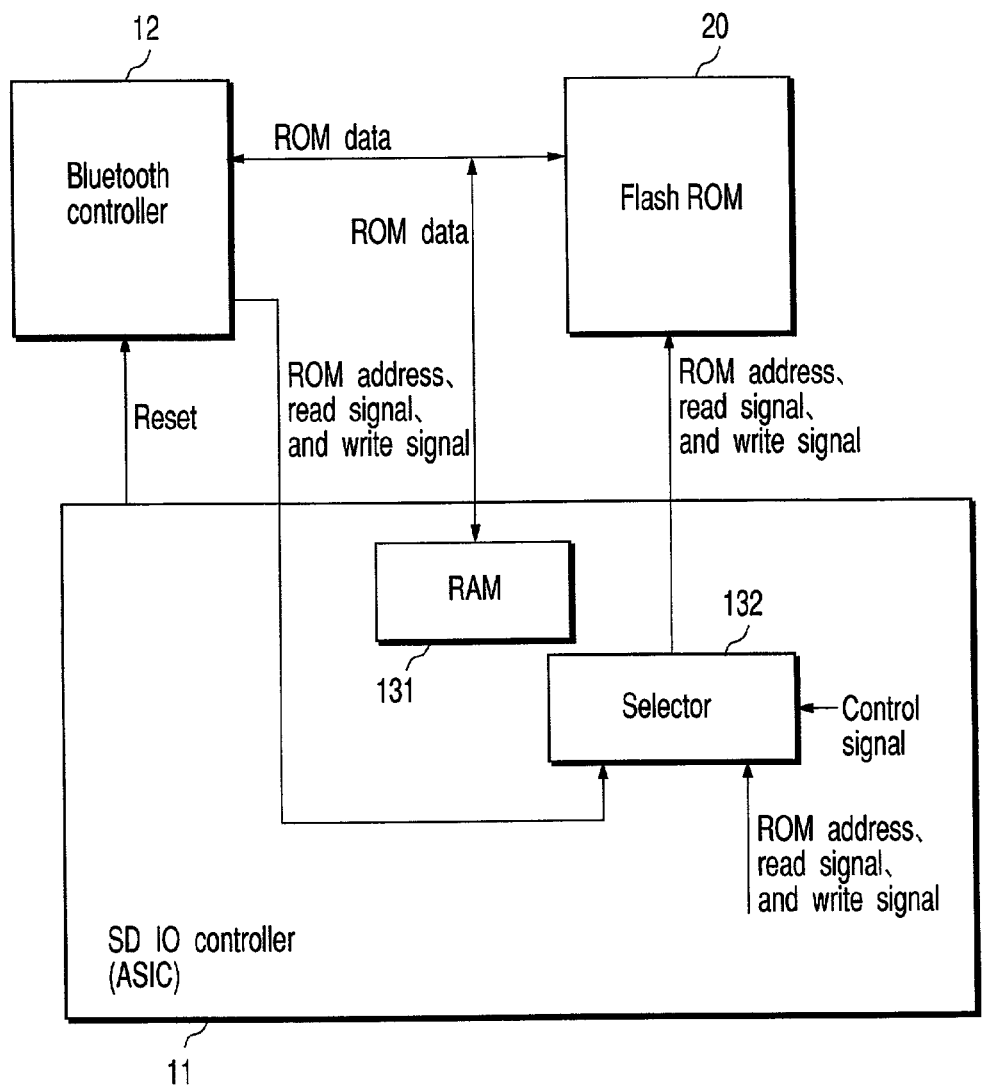
FIG. 13 is a view for explaining exclusive control of a flash ROM in the radio communication card shown in FIG. 12.

That is, as shown in FIG. 13, the SD IO controller 11 has a selector 132 which selectively supplies to the flash ROM 20 an access control signal from the Bluetooth controller 12 and an address control signal generated inside the SD IO controller 11.

When the SD BT card 100 is initialized, an access control signal generated inside the SD IO controller 11 is selected by the selector 132, and the card attribute information is loaded from the flash ROM 20 into an internal RAM 131 of the SD IO controller 11. After the card attribute information is loaded, i.e., after the initialization is completed, an access control signal from the Bluetooth controller 12 is selected by the selector 132. This permits the Bluetooth controller 12 to monopolize the flash ROM 20. Note that the CSA is also uploaded to the host apparatus 200 upon card initialization, so no access conflict occurs.

More specifically, access to the flash memory 20 is performed by the following procedure.

Upon initialization, the SD IO controller 11 first outputs a reset signal to the Bluetooth controller 12, thereby inhibiting ROM access of the Bluetooth controller 12 and opening the ROM data line of the Bluetooth controller 12 (setting this ROM data line in a high-impedance state). The SD IO controller 11 then supplies to the flash ROM 20 an access control signal for loading the card attribute information, and stores the loaded card attribute information into the RAM 131. Next, in accordance with a request from the host apparatus 200, the SD IO controller 11 supplies to the flash ROM 20 an access control signal for loading the CSA, and uploads the contents of the loaded CSA to the host apparatus 200. After that, the flash ROM 20 is opened to the Bluetooth controller 12.

The Bluetooth controller 12 outputs an access control signal for loading the firmware. This access control signal is input to the SD IO controller 11 and supplied from this SD IO controller 11 to the flash ROM 20. Consequently, the firmware is transferred from the flash ROM 20 to the Bluetooth controller 12.

Figure 14:
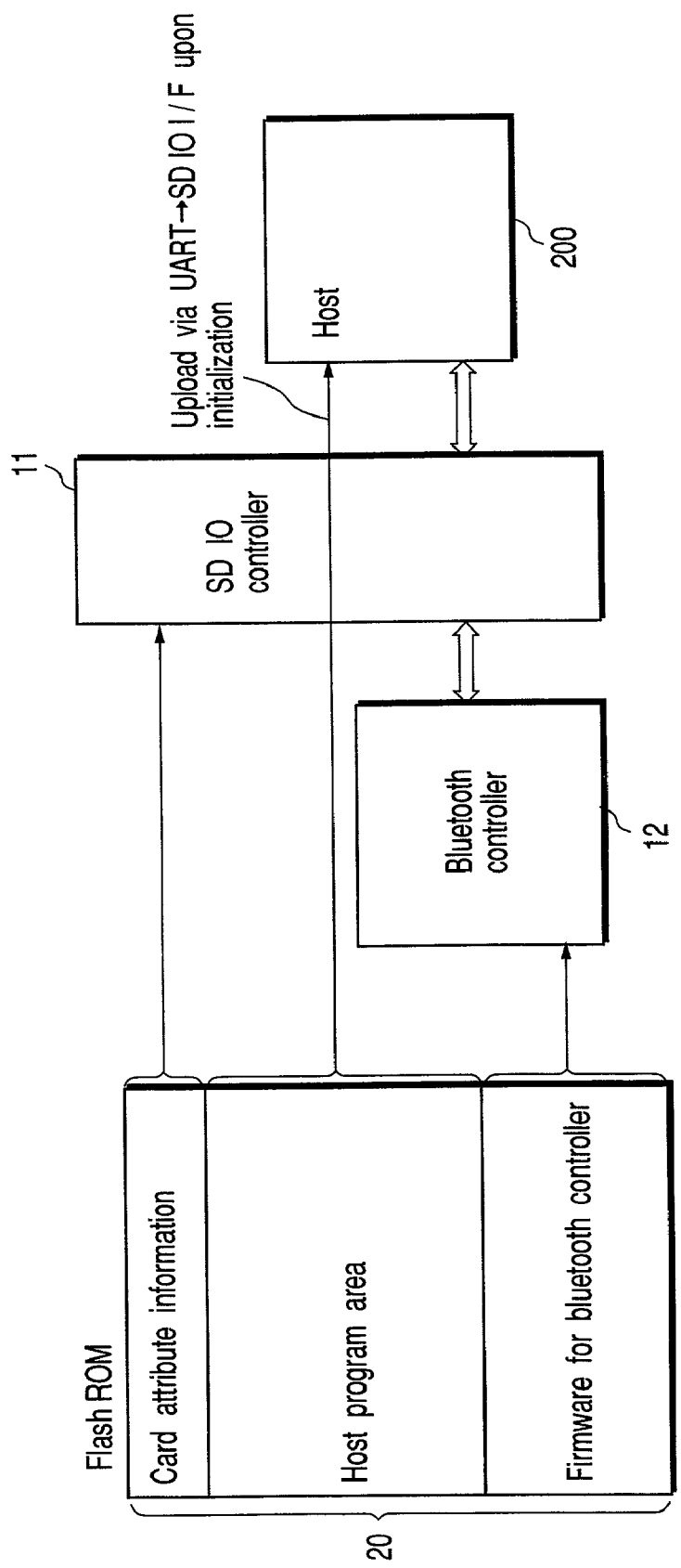
FIG. 14 is a view for explaining the state of use of the flash ROM in the radio communication card shown in FIG. 12.

FIG. 14 shows the state of use of the flash ROM 20.

As shown in FIG. 14, in this flash ROM 20, a unique memory address space is allocated to each of the card attribute information, CSA, and firmware. The SD IO controller 11 uses the memory address spaces for the card attribute information and CSA. The Bluetooth controller 12 uses the address space for the firmware.

The mounting structures of the SD BT card 100 will be described below with reference to FIGS. 15A to 15C and 16A to 16C. Note that these structures correspond to the configuration using one flash ROM 20.

The mounting structures of the SD BT card 100 according to this embodiment have two types: a type (type A) by which the antenna 15 is mounted on the front surface of the card substrate of the SD BT card 100; and a type (type B) by which the antenna 15 is mounted on the rear surface of the card substrate of the SD BT card 100. This is to allow a user to select an optimum type of the SD BT card 100 in accordance with the host apparatus 200 used.

Figures 15A, 15B:
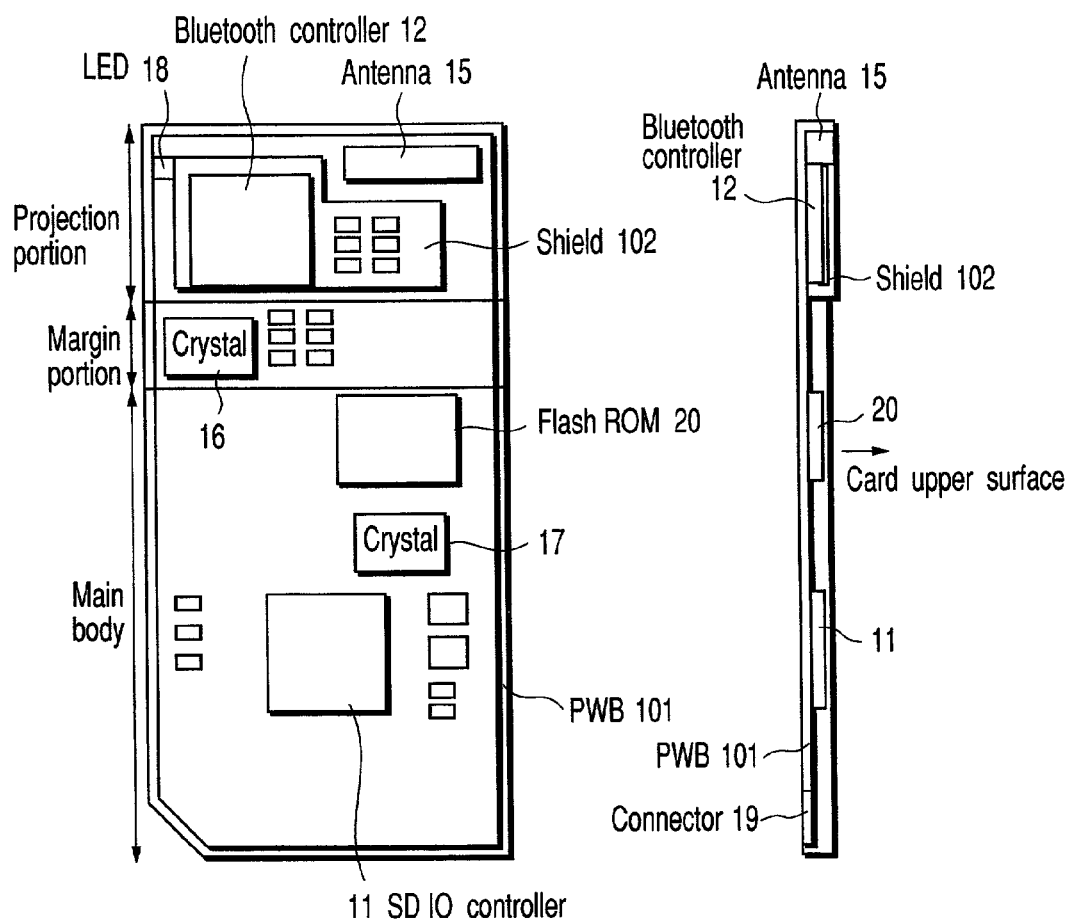
FIGS. 15A to 15C are views showing the mounting structure of the radio communication card of the embodiment.
Figure 15C:
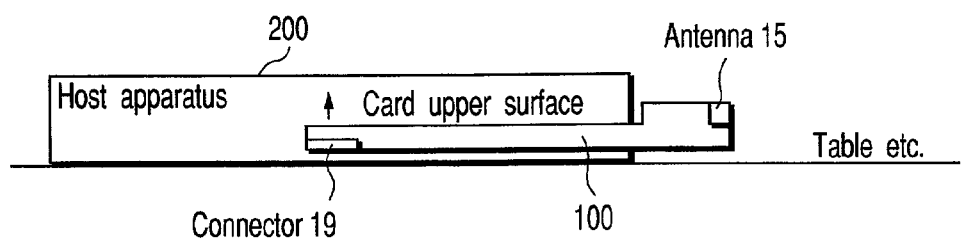

FIGS. 15A to 15C illustrate the mounting structure of type A. FIG. 15A is a plan view showing the arrangement of parts on a printed wiring board (PWB) 101, and FIG. 15B is a side view thereof. FIG. 15C shows the state in which the SD BT card 100 is inserted into the card slot of the host apparatus 200.

The printed wiring board (PWB) 101 has a dual-side mounting structure. On the upper surface side of this printed wiring board (PWB) 101, the SD IO controller 11, the quartz oscillator 17, and the flash ROM 20 are mounted in the main body, the quartz oscillator 16 is mounted in the margin portion, and the Bluetooth controller 12, the antenna 15, and the LED 18 are mounted in the projecting portion. The Bluetooth controller 12 is shielded by a shielding member 102.

On the lower surface side of the printed wiring board (PWB) 101, the connector unit 19 is positioned near the card end portion in the main body so as to be exposed from the rear surface of the card substrate.

In the projecting portion at the lower surface side of the printed circuit board (PWB) 101, a type B antenna mounting region is formed in a position corresponding to the mounting position of the antenna 15 on the upper surface side of the printed wiring board (PWB) 101, in order for a single printed wiring board to be used as both types A and B. That is, the printed wiring board (PWB) 101 has antenna mounting regions on its front and rear surfaces.

As shown in FIG. 15C, this mounting structure of type A is suited to the host apparatus 200 having a card slot structure in which the card upper surface faces up. This is so because when the host apparatus 200 is placed on a table, the position of the antenna 15 can be separated from the table surface, and this can reduce deterioration of the radio wave environment even when the table is made of a metal. Also, since the Bluetooth controller 12 is formed together with the antenna 15 in the projecting portion, this Bluetooth controller 12 is well shielded without any influence on the thickness of the main body. Furthermore, placing the quartz oscillator 16 for the Bluetooth controller 12 in the margin portion can reduce the distance between the Bluetooth controller 12 and the quartz oscillator 16. This can suppress the propagation delay of a clock signal and the like.

Even when the Bluetooth controller 12 has a 2-chip configuration including a baseband unit and RF unit, at least the RF unit requiring a shield is preferably formed together with the antenna 15 in the projecting portion.

Figures 16A, 16B:
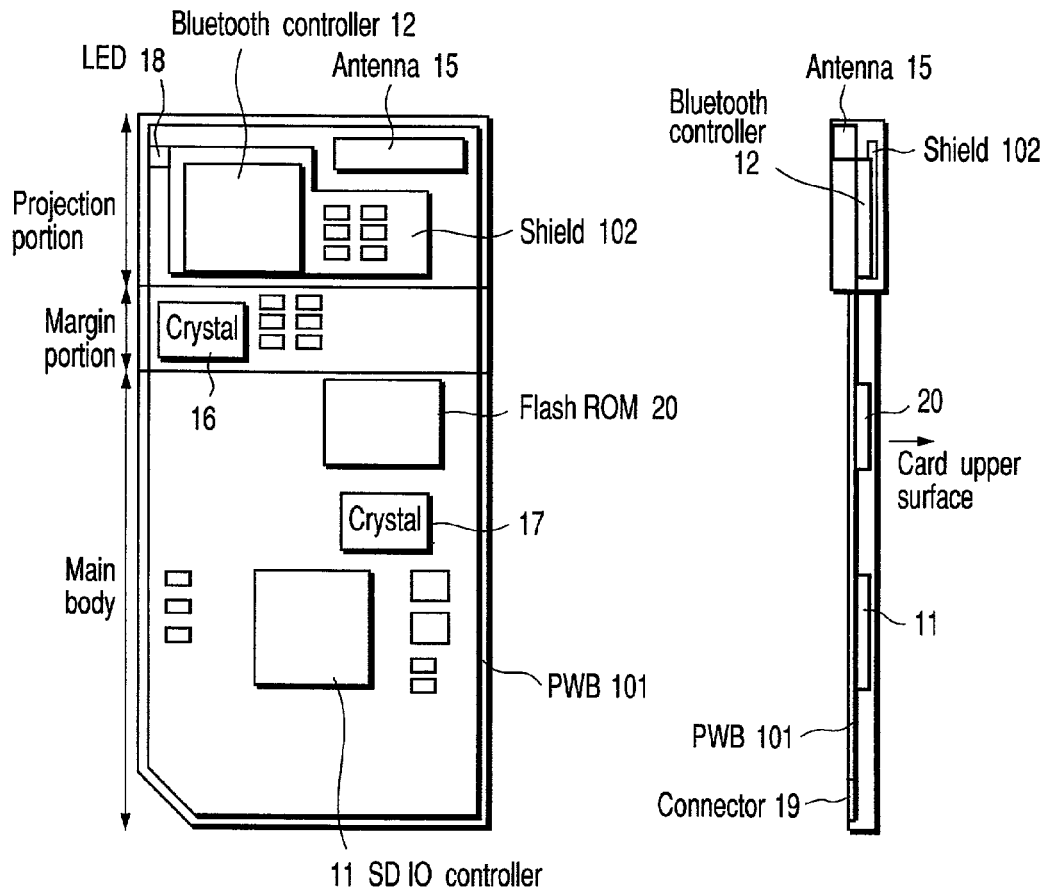
FIGS. 16A to 16C are views showing another example of the mounting structure of the radio communication card of the embodiment.
Figure 16C:
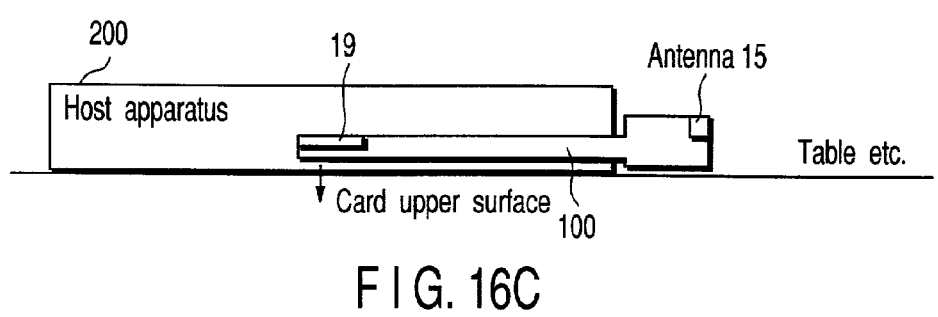

FIGS. 16A to 16C illustrate the mounting structure of type B. FIG. 16A is a plan view showing the arrangement of parts on the printed wiring board (PWB) 101, and FIG. 16B is a side view thereof. FIG. 16C shows the state in which the SD BT card 100 is inserted into the card slot of the host apparatus 200.

A difference from type A shown in FIGS. 15A to 15C is that the antenna 15 is formed on the same lower surface side as the mounting surface of the connector unit 19, not on the upper surface side of the printed wiring board (PWB) 101. The rest is the same as type A.

As shown in FIG. 16C, this mounting structure of type B is suited to the host apparatus 200 having a card slot structure in which the card lower surface (connector mounting surface) faces up. This is so because when the host apparatus 200 is placed on a table, the position of the antenna 15 can be separated from the table surface, and this can reduce deterioration of the radio wave environment even when the table is made of a metal.

Control of the LED 18 will be described below with reference to FIGS. 17 and 18.

Figure 17:
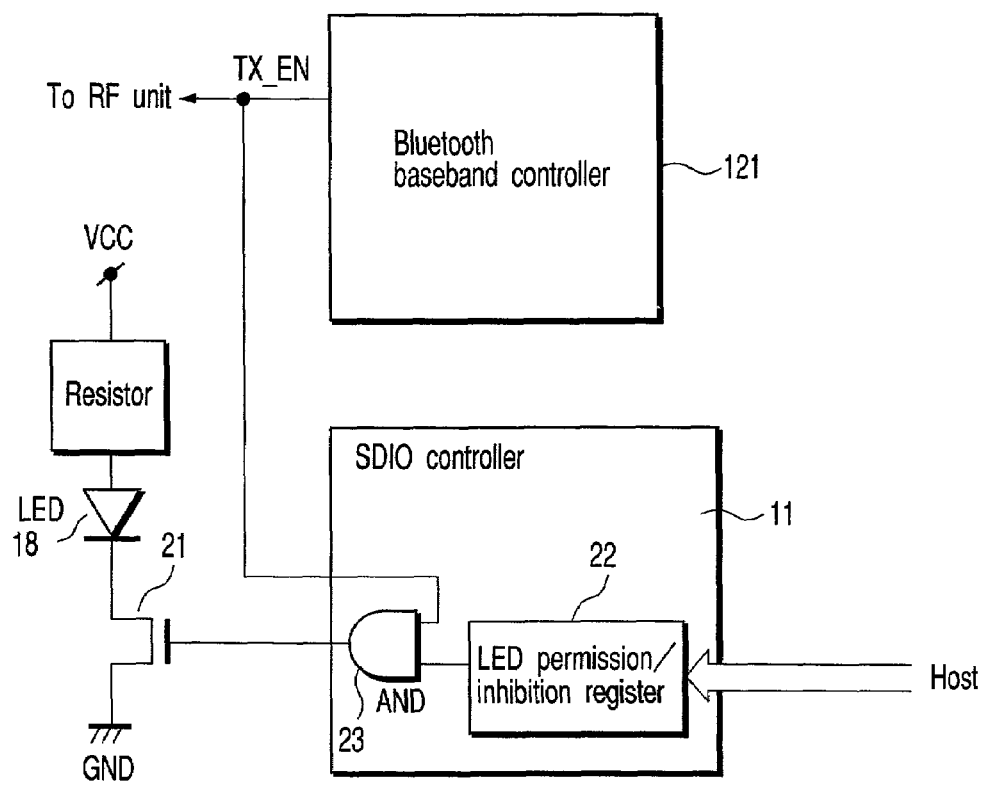
FIG. 17 is a view showing a circuit configuration for LED control installed in the radio communication card of the embodiment.
Figure 18:
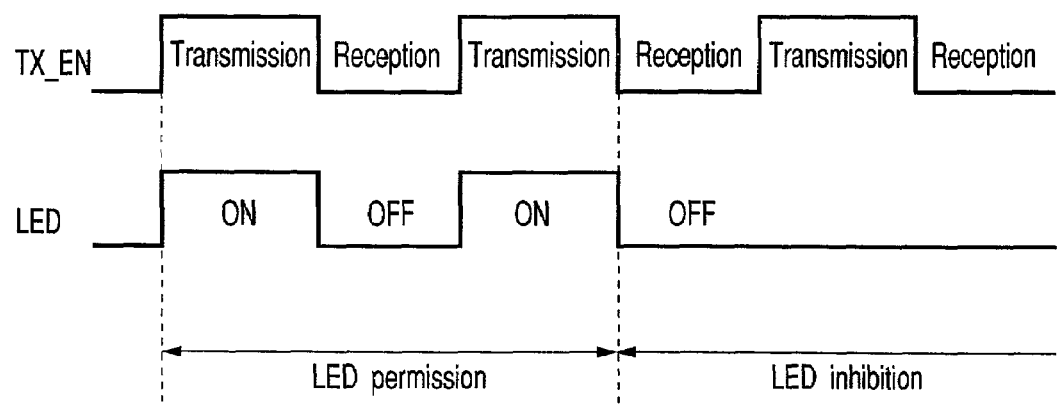
FIG. 18 is a timing chart showing the operation of controlling permission/inhibition of lighting of an LED in the radio communication card of the embodiment.

As shown in FIG. 17, the Bluetooth baseband controller 121 supplies to the RF unit a transmission enable signal TX_EN indicating transmission of a radio signal. Bluetooth uses TDD which time-divisionally performs transmission and reception. The transmission enable signal TX_EN becomes active "1" at a predetermined time interval. During a period in which this transmission enable signal TX_EN is "0", a radio signal is received.

The SD IO controller 11 has an AND gate 23 and an LED permission/inhibition register 22 which can be accessed from the host apparatus 200. This LED permission/inhibition register 22 is for permitting or inhibiting lighting of the LED 18, and supplies a control signal of "1" indicating permission of lighting or "0" indicating inhibition to one input terminal of the AND gate 23. The other input terminal of this AND gate 23 receives the transmission enable signal TX_EN. The output from the AND gate 23 is connected to the gate of a FET 21 which is a switch for controlling ON/OFF of the LED 18.

The LED 18 is normally turned on. As shown in FIG. 18, during a radio communication period, the LED 18 is repetitively turned on and off in accordance with the timings of the transmission enable signal TX_EN. If the host apparatus 200 inhibits lighting of this LED 18, the output from the AND gate 23 becomes "0" at all times, so the LED 18 is not turned on. In this way, lighting of the LED 18 can be inhibited where necessary by using the means for permitting/inhibiting lighting of the LED 18. This can reduce the power consumption of the host apparatus.

In this embodiment as described above, a card having a radio communication function can be realized with an extremely simple arrangement. Therefore, this card can be used as an extended I/O device optimum for a mobile apparatus.

The present invention is not limited to the above embodiment and can be variously modified when practiced without departing from its gist. In addition, the above embodiment includes inventions in various stages, so diverse inventions can be extracted by appropriately combining a plurality of components disclosed. For example, even when some of all the components disclosed in the embodiment are deleted, the arrangement from which these components are deleted can be extracted as an invention if the problems described in the Problems to be Solved by the Invention section can be solved and the effects explained in the Effects of the Invention section can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A radio communication apparatus detachably attached to a host apparatus, comprising:
a radio communication device;
an interface interfacing with said host apparatus;
a communication controller having a control register which is directly accessed from said host apparatus via said interface, said communication controller performing communication between said interface and said radio communication device on the basis of contents of said control register set by said host apparatus; and
a nonvolatile memory storing a control program of said radio communication apparatus, which is to be executed by said host apparatus, wherein
said host apparatus controls communication performed by said communication controller by accessing said control register in accordance with the control program.

2. An apparatus according to claim 1, wherein the radio communication apparatus includes a card.

3. An apparatus according to claim 1, wherein the communication controller includes a serial communication controller.

4. An apparatus according to claim 1, wherein said communication controller includes a UART (Universal Asynchronous Receiver/Transmitter).

5. An apparatus according to claim 1, wherein
a connector unit including a plurality of electrodes is formed on a surface of a substrate of said radio communication card, and
said interface interfaces with said host apparatus via said connector.

6. A radio communication apparatus detachably attached to a portable electronic apparatus used as a host apparatus, comprising:
a radio communication device performing radio communication with one or more radio apparatuses by using an industrial band;
a connector unit including a plurality of electrodes formed on a surface of a substrate of said radio communication card;
an interface interfacing said host apparatus with said radio communication device via said connector unit;
a communication controller having a control register which is directly accessed from said host apparatus via said interface, said communication controller performing, on the basis of contents of said control register set by said host apparatus, communication of data to be transmitted from said radio communication device and data received by said radio communication device between said interface and said radio communication device; and
a nonvolatile memory storing a control program of said radio communication apparatus, which is to be executed by said host apparatus,
wherein said host apparatus controls communication by said communication controller by accessing said control register in accordance with the control program.

7. An apparatus according to claim 6, wherein the radio communication apparatus includes a card.

8. An apparatus according to claim 6, wherein the communication controller includes a serial communication controller.

9. A radio communication apparatus detachably attached to a host apparatus, comprising:
a radio communication device having a built-in processor;
a nonvolatile memory storing a firmware for controlling an operation of said built-in processor of said radio communication device and storing a control program of said radio communication device to be executed by said host apparatus;
an interface interfacing with said host apparatus; and
communication controllers arranged in said interface means and said radio communication device to transmit and receive data between said interface means and said radio communication device,
wherein said communication controller of said interface is controlled by said host apparatus by using a control register which is directly accessed from said host apparatus via said interface, and said communication controller of said radio communication device is controlled by said built-in processor of said radio communication device.

10. An apparatus according to claim 9, wherein the radio communication apparatus includes a card.

11. An apparatus according to claim 9, wherein the communication controller includes a serial communication controller.

12. A radio communication card detachably attached to a host apparatus, comprising:
a radio communication device;
an interface interfacing with said host apparatus, said interface having a first mode in which data is transferred to and from said host apparatus by using a plurality of data pins of said radio communication card and a second mode in which data is transferred to and from said host apparatus by using a specific data pin of said plurality of data pins, and communicating with said host apparatus by one of the first and second modes; and
a unit transmitting and receiving an audio signal between said host apparatus and said radio communication device by using the second mode, said
unit allocating an unused data pin in the second mode to transmission and reception of an audio signal between said host apparatus and said radio communication device, and transmitting and receiving an audio signal between said host apparatus and said radio communication device via said unused data pin.

13. A card according to claim 12, further comprising an audio signal codec arranged between said interface and said radio communication device to modulate and demodulate the audio signal transmitted and received between said host apparatus and said radio communication device.

14. A card according to claim 12, further comprising a unit configured to inhibit and permit allocation of an unused data pin in the second mode to transmission and reception of the audio signal between said host apparatus and said radio communication device.

15. A radio communication card detachably attached to a portable electronic apparatus used as a host apparatus, comprising:
a radio communication device performing radio communication with one or more radio apparatuses by using an industrial band;
a connector unit including a plurality of electrodes formed on a surface of a substrate of said radio communication card, said plurality of electrodes of said connector unit being defined as data pins;
an interface interfacing said host apparatus with said radio communication device via said connector unit, said interface having a first mode in which data is transferred to and from said host apparatus by using a plurality of data pins and a second mode in which data is transferred to and from said host apparatus by using a specific data pin of said plurality of data pins;
an audio signal codec arranged between said interface and said radio communication device to modulate and demodulate an audio signal exchanged between said host apparatus and said radio communication device; and
a unit allocating an unused data pin in the second mode to transmission and reception of an audio signal between said host apparatus and said radio communication device, and executing transmission and reception of the audio signal between said audio signal codec and said host apparatus via said unused data pin.

16. A radio communication card detachably attached to a host apparatus, comprising:
a radio communication device having a built-in processor;
an interface interfacing with said host apparatus; and
a single nonvolatile memory shared by said radio communication device and said interface, said nonvolatile memory storing firmware for controlling the operation of said built-in processor of said radio communication device, and card attribute information of said radio communication card, which is to be referred to by said host apparatus,
wherein said interface comprises a unit loading the card attribute information from said nonvolatile memory into a memory of said interface when said radio communication card is initialized, and
said nonvolatile memory is exclusively possessed by said radio communication device after the card attribute information is loaded.

17. A radio communication card detachably attached to a host apparatus, comprising:
a radio communication device having a built-in processor;
an interface interfacing with said host apparatus;
a single nonvolatile memory shared by said radio communication device and said interface, said nonvolatile memory storing firmware for controlling the operation of said built-in processor of said radio communication device, and card attribute information of said radio communication card, which is to be referred to by said host apparatus; and
a unit receiving a first access control signal by which said interface accesses said nonvolatile memory, and a second access signal by which said radio communication device accesses said nonvolatile memory, said unit selecting and supplying the first access control signal to said nonvolatile memory when said radio communication card is initialized, and supplying the second access control signal to said nonvolatile memory after the card attribute information is loaded.

18. A card according to claim 17, wherein said nonvolatile memory further stores a control program of said radio communication card, which is to be executed by said host apparatus, and
the control program is uploaded to said host apparatus via said interface when said radio communication card is initialized.

19. A radio communication card detachably attached to a host apparatus, comprising:
a radio communication device;
an interface interfacing with said host apparatus;
a projecting portion formed on a card substrate of said radio communication card to mount an antenna to be electrically connected to said radio communication device,
wherein said projecting portion has at least an RF controller of said radio communication device together with said antenna;
a communication controller having a control register which is directly accessed from said host apparatus via said interface, said communication controller performing communication between said interface and said radio communication card on the basis of contents of said control register set by said host apparatus; and
a nonvolatile memory storing a control program of said radio communication card, which is to be executed by said host apparatus, wherein said host apparatus controls communication performed by said communication controller by accessing said control register in accordance with the control program.

20. A card according to claim 19, wherein said RF controller is covered with a shielding member.

21. A radio communication card detachably attached to a portable electronic apparatus used as a host apparatus, comprising:
- a radio communication device having a baseband unit and an RE controller to perform radio communication with one or more radio apparatus by using an industrial band;
- a connector unit including a plurality of electrodes formed on a surface of a substrate of said radio communication card;
- an interface interfacing said host apparatus with said radio communication device via said connector unit;
- a projecting portion formed on a card substrate of said radio communication card so as to project to an outside from a card accommodating portion of said portable electronic apparatus when accommodated in said portable electronic apparatus, said projecting portion being made thicker than a substrate portion to be accommodated in said card accommodating portion,
- wherein at least an RF controller and an antenna connected to said RF controller, which construct said radio communication device, are accommodated in said projecting portion, said RE controller being covered with a shielding member formed in said projecting portion;
- a communication controller having a control register which is directly accessed from said host apparatus via said interface, said communication controller performing communication between said interface and said radio communication card on the basis of contents of said control register set by said host apparatus; and
- a nonvolatile memory storing a control program of said radio communication card, which is to be executed by said host apparatus, wherein
- said host apparatus controls communication performed by said communication controller by accessing said control register in accordance with the control program.

22. A radio communication card detachably attached to a host apparatus, comprising:
- a radio communication device;
- a connector unit including a plurality of electrodes formed on a surface of a substrate of said radio communication card;
- an interface device interfacing with said host apparatus via said connector unit;
- a printed wiring board for mounting said radio communication device and said interface device,
- wherein mounting regions for mounting an antenna to be electrically connected to said radio communication device are formed on both front and rear surfaces of said printed wiring board;
- a communication controller having a control register which is directly accessed from said host apparatus via said interface device, said communication controller performing communication between said interface device and said radio communication card on the basis of contents of said control register set by said host apparatus; and
- a nonvolatile memory storing a control program of said radio communication card, which is to be executed by said host apparatus, wherein
- said host apparatus controls communication performed by said communication controller by accessing said control register in accordance with the control program.

23. A radio communication card detachably attached to a host apparatus, comprising:
- a radio communication device;
- a card interface controller for interfacing said host apparatus with said radio communication device;
- a UART (Universal Asynchronous Receiver/Transmitter) arranged in said card interface controller to communicate with said radio communication device;
- a communication controller having a control register which is directly accessed from said host apparatus via said card interface controller, said communication controller performing communication between said card interface controller and said radio communication card on the basis of contents of said control register set by said host apparatus; and
- a nonvolatile memory storing a control program of said radio communication card, which is to be executed by said host apparatus, wherein
- said host apparatus controls communication performed by said communication controller by accessing said control register in accordance with the control program.

* * * * *